United States Patent [19]

Blanding

[11] Patent Number: 5,330,388
[45] Date of Patent: Jul. 19, 1994

[54] SHAFT COUPLING UTILIZING TENSION SPRINGS AND RADIALLY AND AXIALLY PROJECTING PINS

[75] Inventor: Douglass L. Blanding, Rochester, N.Y.

[73] Assignee: Eastman Kodak Company, Rochester, N.Y.

[21] Appl. No.: 826,510

[22] Filed: Jan. 27, 1992

[51] Int. Cl.⁵ ............................................. F16D 3/16
[52] U.S. Cl. .................................. 464/106; 464/160; 464/904
[58] Field of Search ................. 464/106, 112–119, 464/147, 162, 169, 904, 905, 102, 65, 137, 157, 160

[56] References Cited

U.S. PATENT DOCUMENTS

| | | | |
|---|---|---|---|
| 1,956,733 | 5/1934 | Small | 464/160 |
| 2,087,364 | 7/1937 | Trbojevich | 464/116 |
| 2,380,672 | 7/1945 | Opitz | 464/69 X |
| 2,552,682 | 5/1951 | Lopez . | |
| 2,696,719 | 12/1954 | Sklar | 464/137 X |
| 3,392,548 | 7/1968 | Meyer | 464/123 |
| 3,792,598 | 2/1974 | Orain | 464/905 X |
| 3,903,711 | 9/1975 | Stage | 464/904 X |
| 4,026,123 | 5/1977 | Durum | 464/111 |
| 4,033,145 | 7/1977 | Warner | 464/124 X |
| 4,114,401 | 9/1978 | Van Hoose | 464/120 |
| 4,392,837 | 7/1983 | Wirth | 464/69 |
| 4,547,101 | 10/1985 | Dowdakin, Sr. | 464/904 X |
| 4,547,177 | 10/1985 | Ueno | 464/69 |
| 4,572,682 | 2/1986 | Iwata | 464/119 X |
| 4,620,514 | 11/1986 | Tseng | 464/69 X |
| 4,623,322 | 11/1986 | Melchior | 464/160 |
| 4,643,698 | 2/1987 | Ehrlenspiel et al. | 464/905 X |
| 4,689,035 | 8/1987 | Orain | 464/118 |
| 4,773,890 | 9/1988 | Iwasaki et al. | 464/111 |
| 4,781,662 | 11/1988 | Mayhew et al. | 464/118 X |

FOREIGN PATENT DOCUMENTS

| | | | |
|---|---|---|---|
| 1315679 | 6/1987 | U.S.S.R. | 464/137 |
| 681679 | 10/1952 | United Kingdom | 464/65 |

*Primary Examiner*—Daniel P. Stodola
*Attorney, Agent, or Firm*—Dennis R. Arndt

[57] ABSTRACT

An input shaft is coupled to an output shaft through a constant velocity joint in which tangentially oriented constraints, spaced 120° apart and resiliently connected, effect the coupling. The input and output shafts have radially projecting pins thereon which abut axially projecting pins on a center coupling element. Tensioned coil springs extend between the radially projecting pins on the input and output shafts while contact element bearings are disposed between the center coupling element and shafts. Alternatively, the input and output shafts are each connected to a center element by tangentially extending wire elements. Alternatively, the shafts are coupled directly to one another with tangentially oriented constraints connected directly to the shafts or shaft elements rather than being connected through an intermediate coupling element.

6 Claims, 9 Drawing Sheets

SHAFT COUPLING UTILIZING TENSION SPRINGS AND RADIALLY AND AXIALLY PROJECTING PINS

FIELD OF THE INVENTION

The instant invention relates to constant velocity joints. More particularly, the instant invention relates to constant velocity joints especially useful for coupling the shafts of devices such as rotary encoders, precision drums, lead screws and the like to motors and for coupling non-rotating machine components to one another.

BACKGROUND ART

Currently available instrument couplings run the risk of unwanted rotational errors being introduced by shaft misalignment. When extreme precision is needed in connecting rotary encoders, imaging drums and lead screws to motors, these slight rotational errors can result in serious performance problems. In the connection between the nut and carriage on a lead screw driven carriage arrangement, any angular misalignment between the lead screw and carriage rails can produce cyclic errors in carriage position, even if the lead screw is perfectly machined.

It would appear that the aforementioned difficulties could be alleviated by utilizing couplings of appropriate configuration. Constant velocity joints are routinely used in front wheel drive automobiles to minimize the transmission of speed pulsations when the wheels are turned, but to the inventors' knowledge, similar joints have not been employed in electromechanical instrumentation or as non-rotational couplings between mechanical components.

Exemplary of constant velocity joints of particular interest with respect to drives such as automobile drives are U.S. Pat. Nos. 4,033,144; 1,522,351; 1,524,161; 1,665,280; and 1,916,442. While the constant velocity joints shown in these patents are useful for relatively large devices such as motor vehicles, they are not disclosed as being of particular interest with respect to instrumentation where only very slight rotational errors may be introduced due to shaft misalignment.

Patents such as U.S. Pat. Nos. 4,623,322; 4,572,682; and 4,547,177 are of interest in that they utilize an intervening central element to effect coupling in either a constant velocity joint or universal joint. Patents such as U.S. Pat. Nos. 4,609,302; 4,033,145; 3,903,711; 3,392,548; and 2,552,682 disclose effecting coupling with radially oriented pins. There are advantages to both of these approaches. However, neither of these groups of patents combine the advantages of both approaches in a single device to provide a constant velocity joint which is especially suitable for instrumentation applications and the like.

The prior art also includes U.S. Pat. Nos. 4,620 514; 4,392,837; 2,380,602; and 459,325 wherein radially offset protrusions are connected to one another by structural elements in tension or compression. The devices disclosed in these patents are not identified as being of specific interest with respect to constant velocity couplings useful in instrumentation and tend to have somewhat complex configurations not necessarily suitable for relatively inexpensive, small scale applications.

Couplings between members which are not designed to rotate with respect to one another, such as couplings between the carriage and nut in a lead screw driven arrangement can also introduce slight errors due to misalignment and flexing. This misalignment may result from exceeding tolerances during manufacture and assembly or may be introduced by environmental factors such as thermal expansion, vibrations or humidity. Accordingly, there is also a need for a coupling having the characteristics of a constant velocity joint for such rigid connections.

SUMMARY OF THE INVENTION

It is an objection of the instant invention to provide new and improved constant velocity joint couplings especially suitable for connections between shafts of rotating encoders, motors, precision drums and the like as well as constant velocity couplings between rigid elements such as, but not limited to, couplings between the carriage and nut in a lead screw driven arrangement.

In view of this object and other objects, a constant velocity joint for connecting an input shaft to an output shaft comprises a coupling arrangement utilizing tangentially oriented constraints.

In accordance with a first specific embodiment of the invention, one of the shafts has three radially oriented surfaces which engage three axially oriented surfaces on the other shaft. Springs retain the radially and axially oriented surfaces in engagement while resisting disengagement between the surfaces and urging the input and output shafts toward one another. This arrangement provides three degrees of freedom between the input and output shafts.

In accordance with a second specific embodiment of the invention, the three constraints allowing three degrees of freedom comprise a group of wires extending tangentially with respect to the input and output shafts with each wire fixed proximate its ends to a radially extending anchor.

In accordance with a third embodiment of the invention, both the input and output shafts have radially oriented surfaces which are engaged with axially oriented surfaces on a coupling element disposed between the shafts. Springs extend between radially oriented elements to hold the assembly together.

In accordance with a fourth embodiment of the invention, the constraints comprise first and second groups of wire elements. The first group of wire elements are each fixed at first ends to the input shaft and at second ends to the coupling element. The second group of wire-elements are each fixed at first ends to the coupling element and at second ends to the output shaft with the wire elements all extending tangentially with respect to the shafts.

In each of the embodiments, the instant invention further contemplates an axial constraint, such as a contact element bearing or wire, between the ends of the shafts and/or coupling elements at a location aligned with the axes of the shafts.

In accordance with a novel application of the constant velocity joints of the instant invention, the constant velocity joints are coupled between two elements which translate linearly together without rotation with respect to one another, such as between a nut and carriage in a lead screw drive arrangement.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
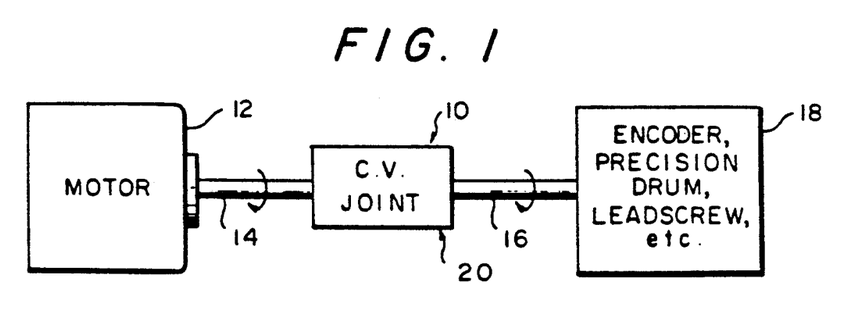
FIG. 1 is a side view showing a motor connected through a coupling, configured in accordance with the principles of the instant invention, to a driven device.

Referring now to FIG. 1, there is shown a drive system, designated generally by the numeral 10, in which a motor 12 is connected by shaft 14 to the shaft 16 of a driven device 18 which may be, for example, an encoder, a precision drum, the lead screw of a lead screw drive, or any other driven device requiring rotation introduced by the output shaft of the motor. In accordance with the problem addressed by the instant invention, the driven device 18 may be a component of an instrumentation system or a component of a very precise mechanical system such as a laser printer. In order to compensate for misalignments between the shafts 14 and 16, a constant velocity joint, designated generally by the numeral 20 and configured in accordance with the principles of the instant invention, is used to couple the shafts. The constant velocity joint 20 minimizes cyclical rotational errors introduced through coupling the output and input shafts 14 and 16.

Figures 2, 3, 4:
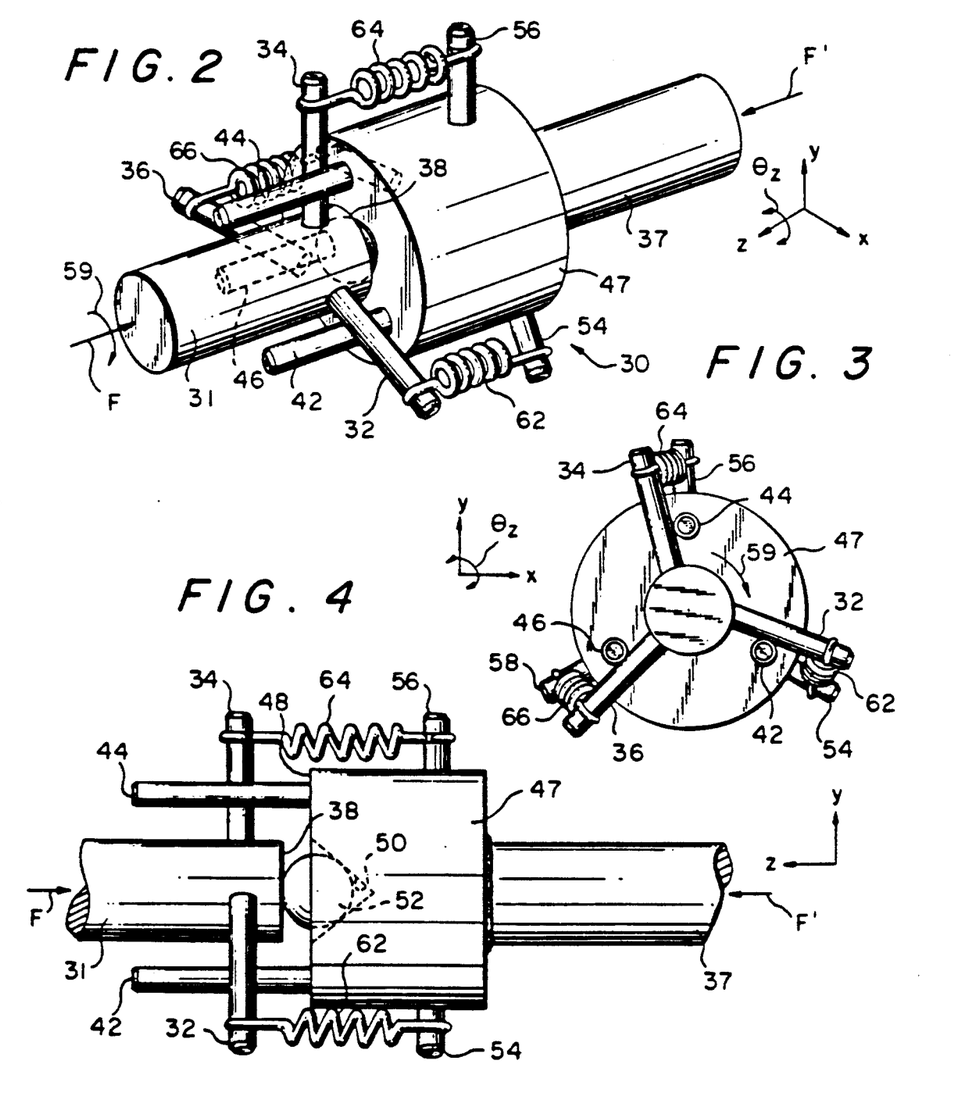
FIG. 2 is a perspective view, with some structure in phantom, of a first embodiment of a constant velocity joint configured in accordance with the principles of the instant invention.
FIG. 3 is an end view of the constant velocity joint of FIG. 2.
FIG. 4 is a side elevational view of the coupling of FIGS. 2 and 3.

Referring now to FIGS. 2-4, there is shown a first embodiment, designated generally by the numeral 30, of the constant velocity joint 20 of FIG. 1. In the first embodiment, the constant velocity joint 30 has an input shaft 31 with three radially projecting pins 32, 34 and 36, disposed proximate an end surface 38 (FIG. 4) thereof. The input shaft 31 of FIGS. 2-4 corresponds to the output shaft 14 of motor 12 in FIG. 1. The constant velocity joint 30 also has an output shaft 37 which corresponds to the input shaft 16 connected to the driven device 18 in FIG. 1. The output shaft 37 has axially projecting pins 42, 44 and 46, placed 120° apart on a hub 47 fixed thereto.

Disposed in the end surface 48 of hub 47 fixed to the output shaft 37 is a conical indentation 50 in which a contact element bearing 52 is received. The contact element bearing 52 abuts the flat end surface 38 of input shaft 31.

Three tensioned coil springs 62, 64 and 66 resiliently connect the input shaft 31 to the output shaft 37. The spring 62 extends between radial pin 32 on the input shaft 34 and radial pin 54 on the hub 47; the spring 64 extends between radial pin 34 on the input shaft and radial pin 56 on the hub, while the spring 66 extends between radial pin 36 on the input shaft and radial pin 58 on the hub.

Upon rotating the input shaft 31 in the clockwise direction 59 with respect to FIGS. 2-4 the radial pins 32, 34 and 36 on the input shaft 31 bear against the axial pins 42, 44 and 46, respectively, projecting from the output shaft 37. This causes the output shaft 37 to rotate in the clockwise direction 59.

Since the input shaft 31 is coupled to coupling element 30, there are constraints defined in the X, Y and Z directions, due to abutment of the radial pins 32, 34 and 36 with the axial pins 42, 44 and 46. Point contact between the ball 52 and end surface 38 of the input shaft 31 constrains the coupling in the Z-direction. Consequently, $\Theta X$ and $\Theta Y$ freedom remain at the joint between input and output shafts 31 and 37.

The engagement between the radial pins 32, 34 and 36 and axial pins 42, 44 and 46 positively connects the input shaft 31 to the output shaft 37 while providing three tangentially oriented constraints at the points of contact. The springs 62, 64 and 66 apply not only a force in the axial or Z direction to hold the coupling 30 together, but also apply a rotational force or torque in the $\Theta Z$ direction to hold the radial and axial pin sets (32, 34, 36) and (42, 44 and 46) in nominal contact. Consequently, the input and output shafts 31 and 37 may be misaligned angularly, axially or radially and still transmit rotational motion at a constant velocity.

Referring now to FIGS. 5-9, there is shown a second embodiment, designated generally by the numeral 70, of the constant velocity joint 20 of FIG. 1. The constant velocity joint 70 couples an input shaft 72, which, for example, might be a shaft such as the shaft 14 of the motor 20 of FIG. 1 to an output shaft 74, which, for example, might be a shaft such as the shaft 16 of FIG. 1 coupled to a driven device 18 such as the encoder, precision drum, or lead screw of FIG. 1.

Figure 5:
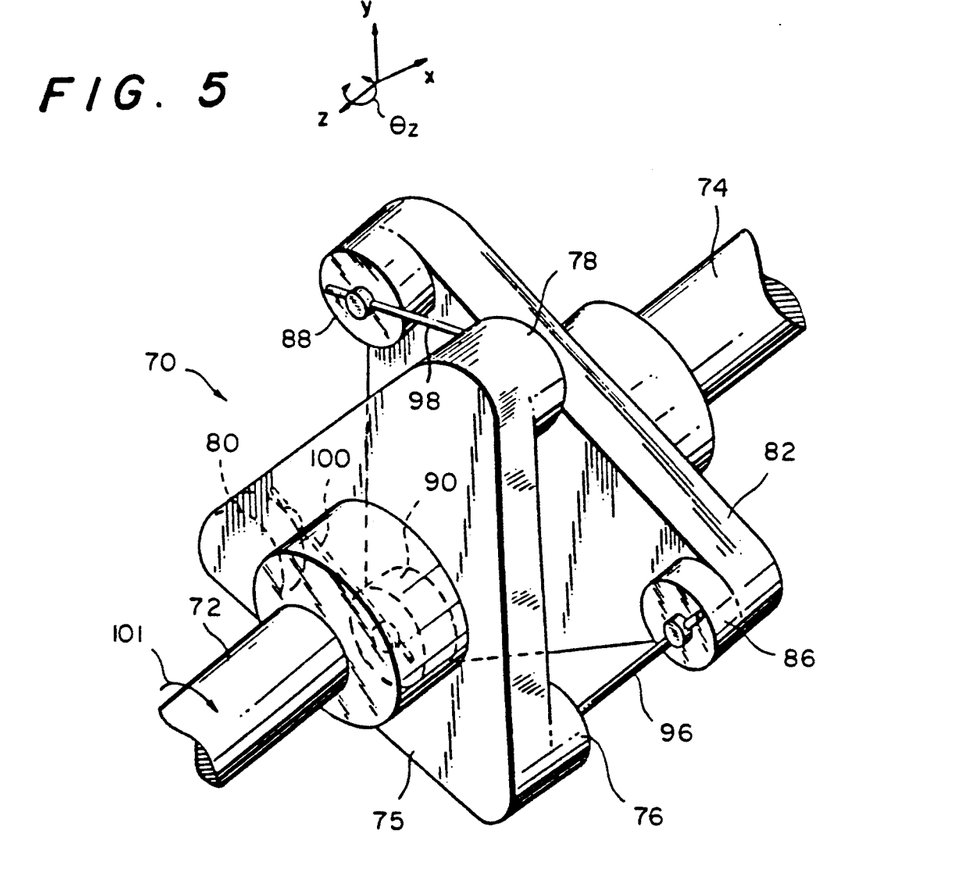
FIG. 5 is a perspective view, with portions in phantom, of a second embodiment of the constant velocity joint configured in accordance with the principles of the instant invention.
Figure 6:
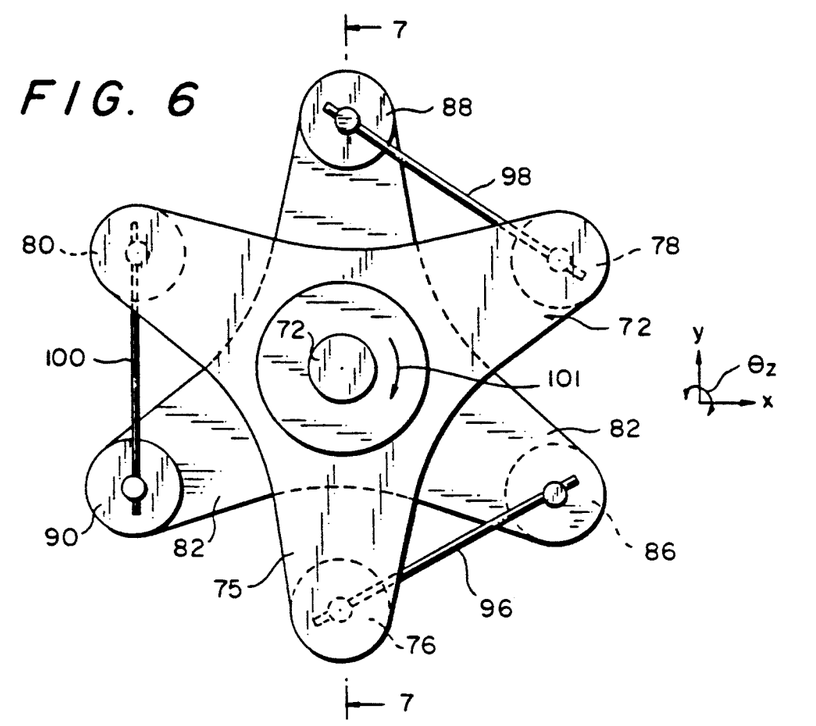
FIG. 6 is an end view of the constant velocity joint of FIG. 5.

The constant velocity joint 70 includes a first triangular coupling hub 75 fixed to input shaft 72. The coupling hub 72 includes three connecting lugs 76, 78 and 80 spaced 120° apart and is aligned with a second triangular coupling hub 82 fixed to the shaft 74 and angularly trailing the coupling hub 72 by 60°. The second coupling hub 82 has lugs 86, 88 and 90, which are connected to the lugs 76, 78 and 80 of first hub 75 by tangentially oriented wire flexure elements 96, 98 and 100, respectively, anchored in fixed relationship proximate first and second ends thereof to the lugs.

The wire flexure elements 96, 98 and 100 are in the illustrated embodiment wires which flex when bent but do not elongate or shorten to any consequential degree when under tension or compression. Such bending occurs when the input and output shafts 72 and 74 are angularly misaligned.

When the input shaft 72 rotates the first triangular coupling hub 75 in the clockwise direction 101, wire elements 96, 98 and 100 are placed in tension which rotates the second triangular coupling hub 82 and output shaft 74 in the clockwise direction.

The coupling 70 accommodates angular misalignment between the input shaft and output shaft 74 while delivering a constant velocity.

Figure 7:
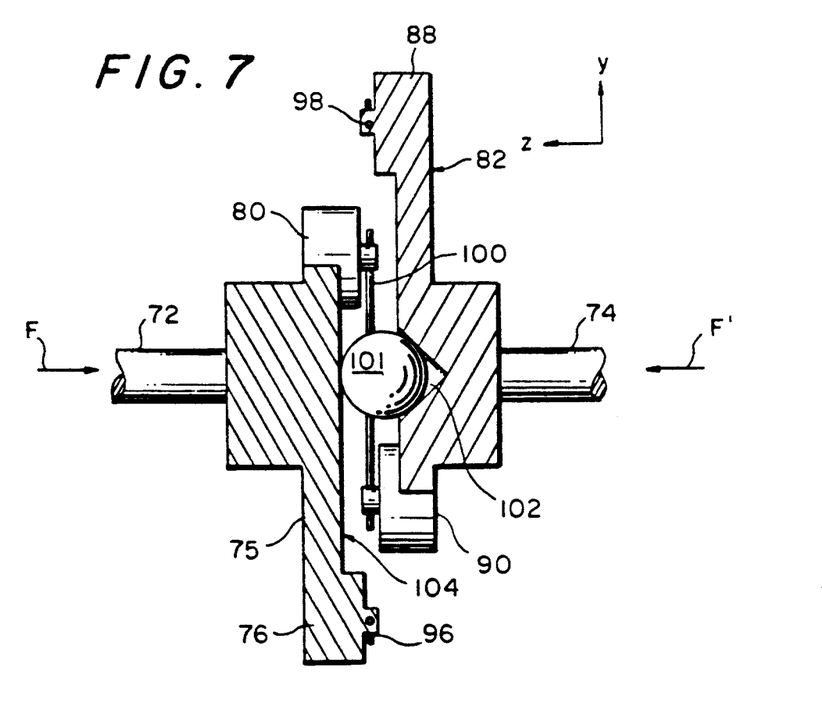
FIG. 7 is an elevational view taken along lines 6—6 7—7 of FIG. 6 showing a contact element bearing providing axial constraint.

As is seen in FIG. 7, a contact element bearing 101 is disposed between the first triangular coupling hub 75 fixed to shaft 72 and the second triangular coupling hub 82 fixed to output shaft 74. As in the first embodiment of FIGS. 2–4, the contact element bearing 101 of FIG. 7 provides a constraint in the Z-direction. The contact element bearing 101 is seated in a conical recess 102 in second triangular coupling hub 82 and bears against a radially extending planar surface 104 on first triangular coupling hub 75. In order to make sure that the contact element bearing 101 remains in contact with surface 104 and 102 axial force F-F' is applied to the shafts 72 and 74 in a conventional way by, e.g., a spring (not shown).

Figure 8:
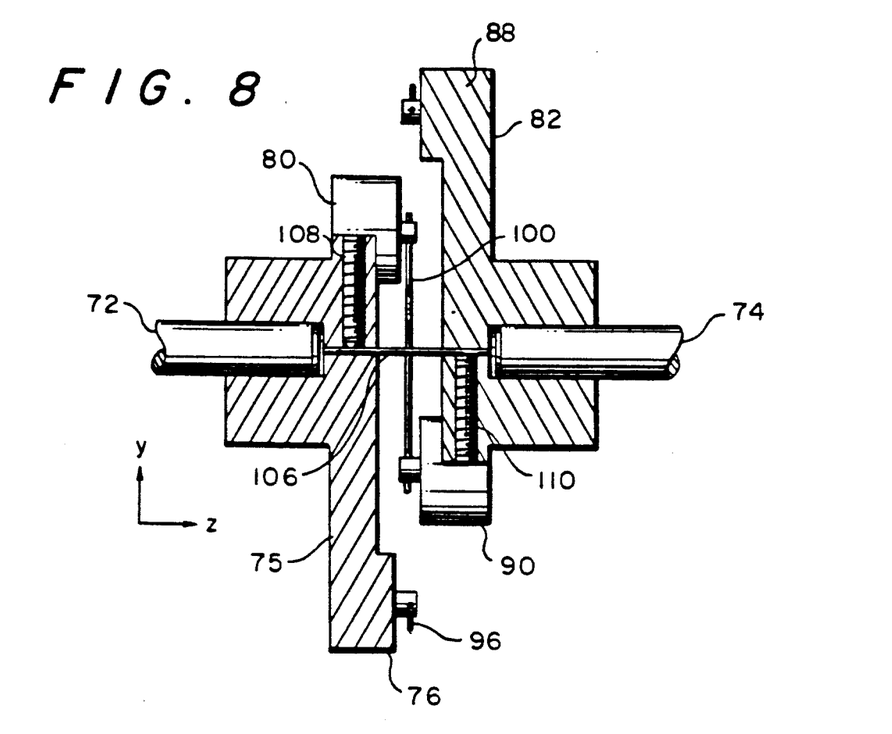
FIG. 8 is an elevational view taken along line 7—7 of FIG. 6 showing a wire providing axial constraint.

As is seen in FIG. 8, the contact element bearing 101 of FIG. 7 may be replaced by a wire 106 fixed to first hub 75 by a set screw 108 and fixed to second hub 82 by a set screw 110 to provide an axial connection between the shafts 72 and 74. Unlike the contact element bearing 101, the wire 106 rigidly resist both compressive and tensile axial forces so that there is no need for an auxiliary spring to provide axial bias.

Figure 9:
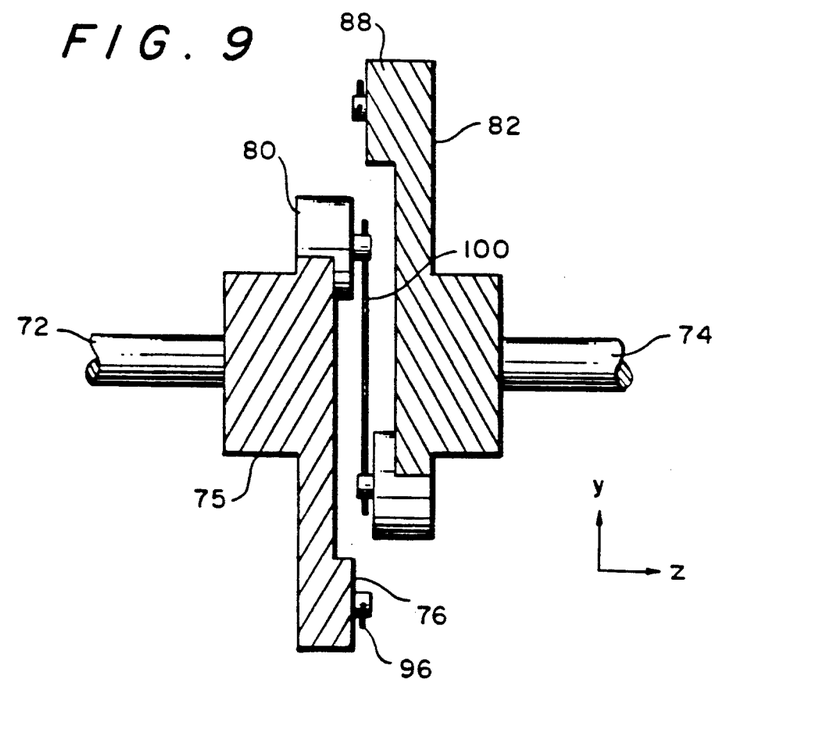
FIG. 9 is an elevational view taken along line 7—7 of FIG. 6 showing a joint not having a positive axial constraint.

As is seen in FIG. 9, there is no rigid axial connection between the hubs 75 and 82 in that the contact element bearing 101 and wire 106 have been deleted. For many applications, an axial connection is neither necessary or desired. For example, most shaft couplings do not need axial rigidity, especially when it is desirable to minimize the transmission of axial impacts from one shaft to the other.

Figure 10:
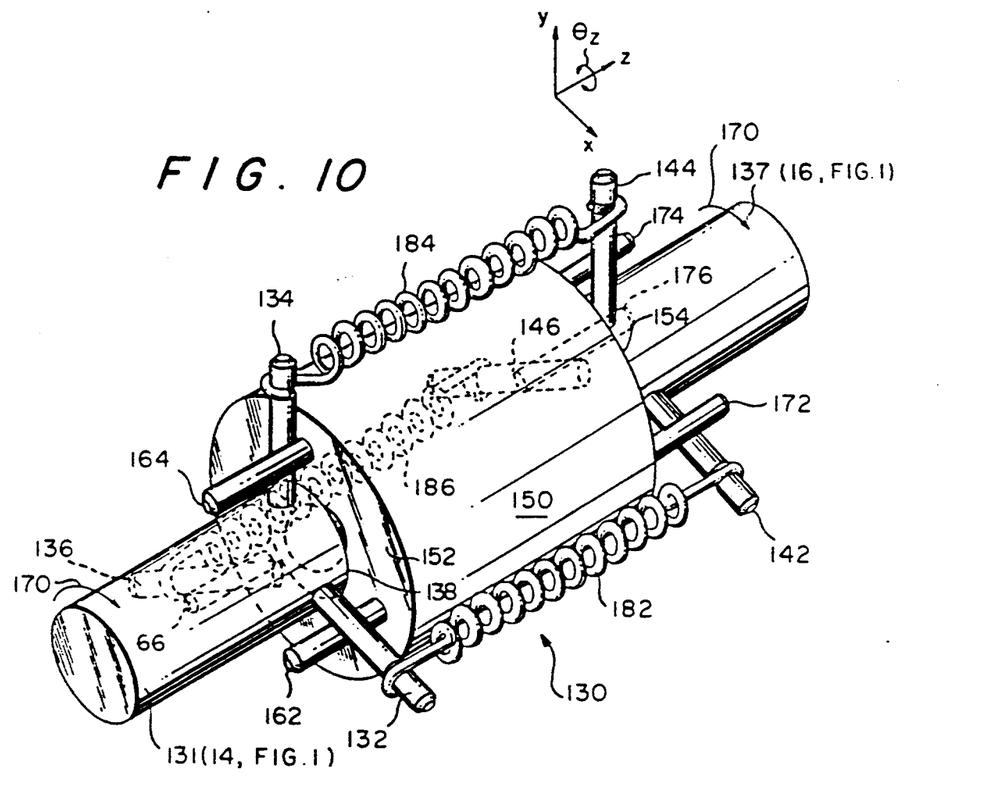
FIG. 10 is a perspective view, with some structure in phantom, of a third embodiment of a constant velocity joint configured in accordance with the principles of the instant invention.
Figure 11:
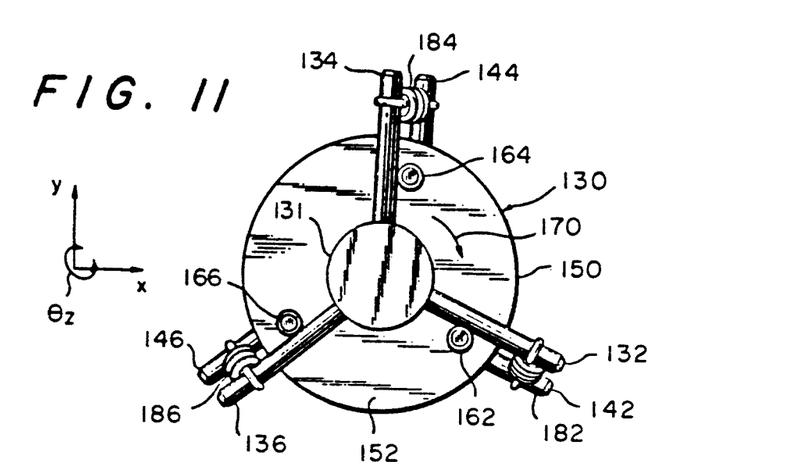
FIG. 11 is an end view of the constant velocity joint of FIG. 10.
Figure 12:
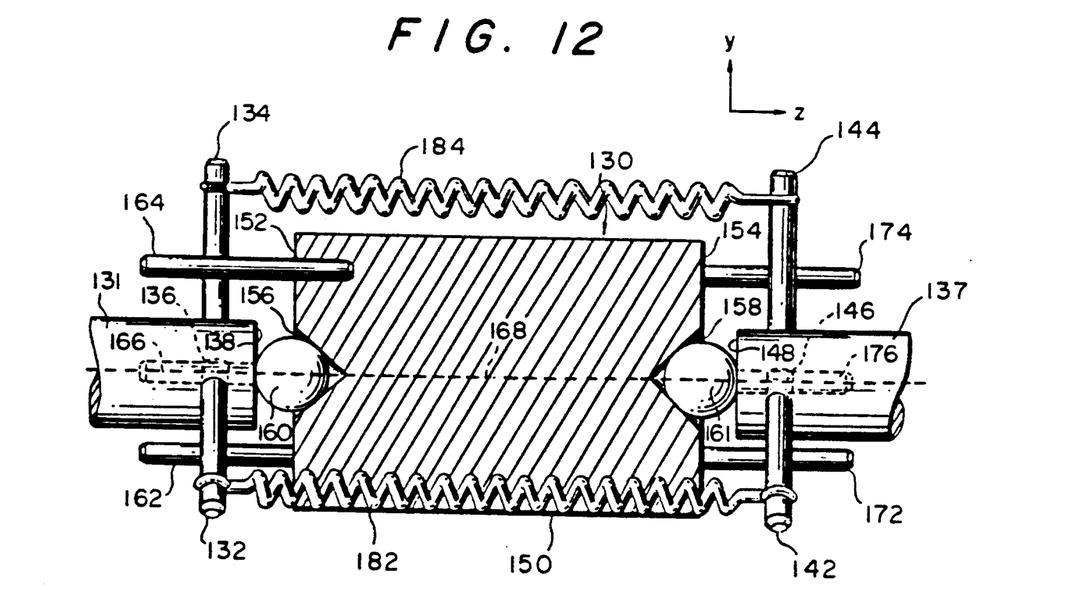
FIG. 12 is a side elevational view of the coupling of FIGS. 10 and 11.

Referring now to FIGS. 10–12, there is shown a first embodiment, designated generally by the numeral 130, of the constant velocity joint 20 of FIG. 1. In the first embodiment, the constant velocity joint 130 has an input shaft 131 with three radically projecting pins 132, 134 and 136, disposed proximate an end surface 138 (FIG. 10) thereof. The input shaft 31 of FIGS. 10–12 corresponds to the output shaft 14 of motor 12 in FIG. 1. The constant velocity joint 130 also has an output shaft 137 which corresponds to the input shaft 16 connected to the driven device 18 in FIG. 1. The output shaft 137 has radially projecting pins 142, 144 and 146, disposed proximate its end 148 (FIG. 4).

Disposed between the ends 138 and 148 of the input and output shafts 131 and 137, respectively, is a cylindrical coupling element 150 which has end surfaces 152 and 154 having conical indentations 156 and 158 therein, which conical indentations receive contact element bearings 160 and 161, respectively. The contact element bearing 160 abuts the flat end surface 38 of input shaft 131, while the contact element bearing 58 abuts the flat end surface 148 of output shaft 137. Projecting from the end 152 of the cylindrical coupling element 50 are three axially extending pins 162, 164 and 166, disposed 120° apart with respect to the axis 168 of the cylindrical coupling element 150. Projecting from surface 154 of the cylindrical coupling element 150 are axial pins 172, 174 and 176, which, like the other axial pins 162, 164 and 166, are spaced 120° apart about the axis 168 of the cylindrical coupling element.

Three tensioned coil springs 182, 184 and 186 resiliently connect the input shaft 131 to the output shaft 137. The spring 82 extends between radial pins 132 and 142; the spring 184 extends between radial pins 134 and 144, while the spring 186 extends between radial pins 136 and 146.

Upon rotating the input shaft 131 in the clockwise direction 170 with respect to FIGS. 10 and 11, the radial pins 132, 134 and 136 on the input shaft 131 bear against the axial pins 162, 164 and 166, respectively, projecting from the cylindrical coupling element 150. This causes the cylindrical coupling element 150 to rotate in the clockwise direction so as to bear the axial pins 172, 174 and 176 projecting from surface 154 tangentially against the radial pins 142, 144 and 146, respectively, projecting from the output shaft 137, thereby rotating the output shaft clockwise.

Since the input shaft 131 is coupled to coupling element 150, there are constraints defined in the X, Y and Z directions, due to abutment of the radial pins 132, 134 and 36 with the axial pins 162, 164 and 166. Point contact between the ball 160 and end surface 138 of the input shaft 131 constrains the coupling in the Z-direction. Consequently, ΘX and ΘY freedom remain at the joint between input and output shafts 131 and 137. The same considerations apply with respect to the coupling between the coupling element 150 and the output shaft 137 wherein X, Y and ΘZ constraints are provided by axial pins 172, 174 and 176, engaging radial pins 142, 144 and 146, respectively, while point contact between the ball 161 and end surface 148 of the output shaft provides constraint in the Z direction. Consequently, ΘX and ΘY freedom exists between the coupling 150 and output shaft 137 so that the ΘX and ΘY freedom exists at both the input and output of the constant velocity joint 130. Consequently, the input and output shafts 131 and 137 may be misaligned angularly or radially and still pass rotational motion through the coupling 130 at the constant velocity.

The engagement between the radial pins 132, 134 and 136 and axial pins 162, 164 and 166 positively connects the input shaft 131 to the cylindrical coupling element 150 while providing three tangentially oriented constraints at the points of contact. The engagement between the axial pins 172, 174 and 176 and radial pins 142, 144 and 146 positively connects the cylindrical coupling element 150 to the output shaft 137 while also providing three tangentially oriented constraints at the points of contact. The springs 182, 184 and 186 apply not only a force in the axial or Z direction to hold the coupling 130 together, but also apply a rotational force or torque in the ΘZ direction to hold the radial and axial pin sets (132, 134, 136) (162, 164, 166) and (142, 144, 146) (172, 174, 176) in nominal contact.

Figure 13:
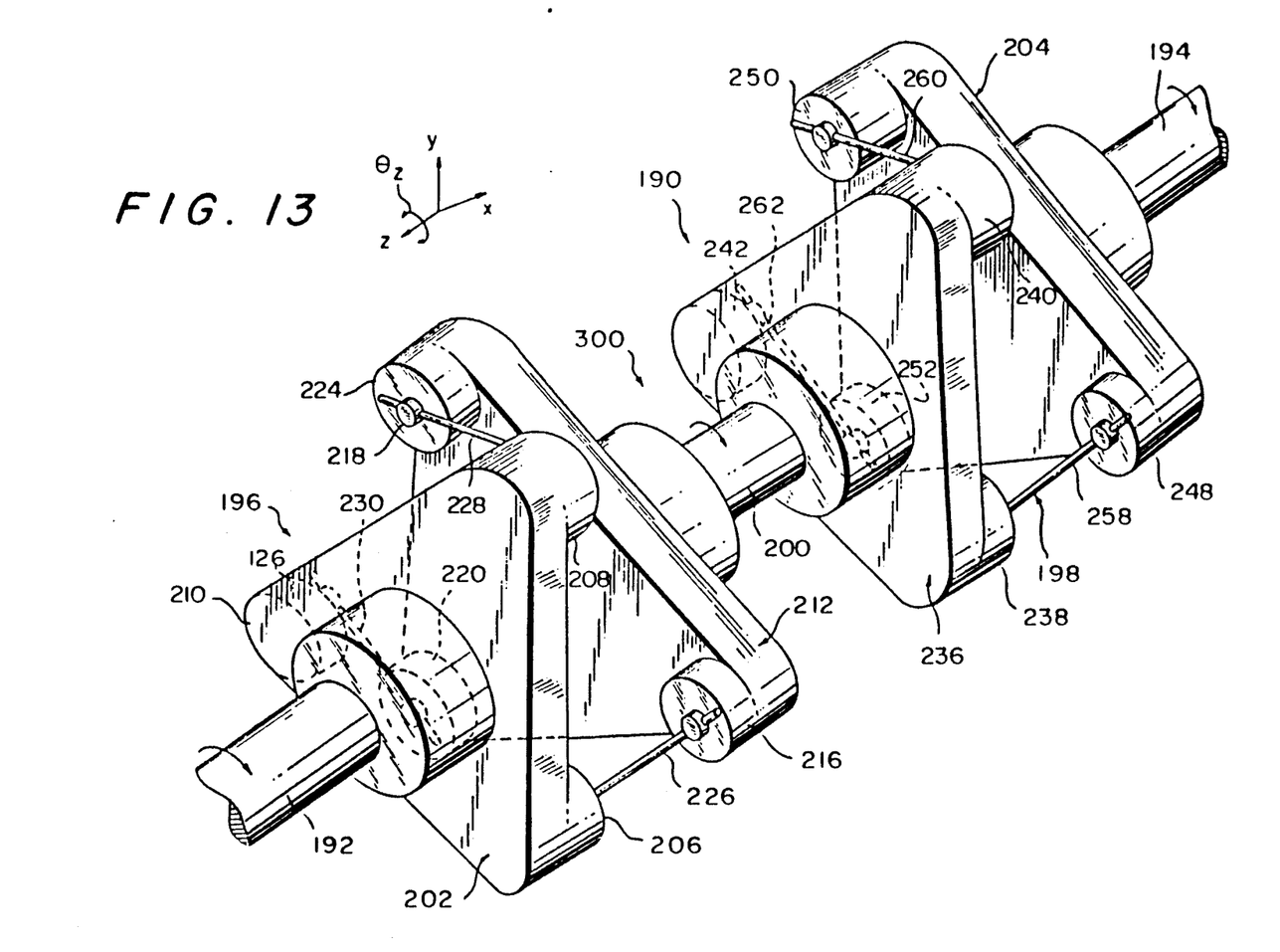
FIG. 13 is a perspective view, with portions in phantom, of a fourth embodiment of the constant velocity joint configured in accordance with the principles of the instant invention.
Figure 14:
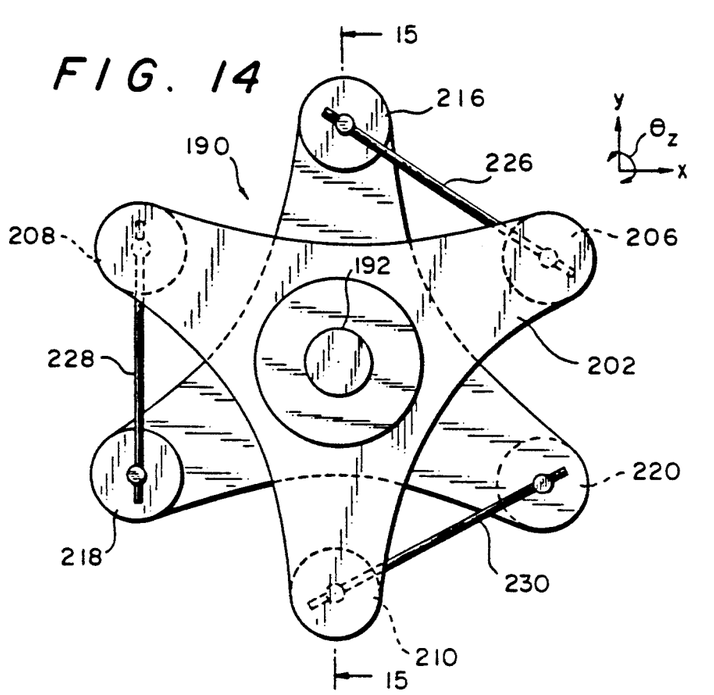
FIG. 14 is an end view of the constant velocity joint of FIG. 13.
Figure 15:
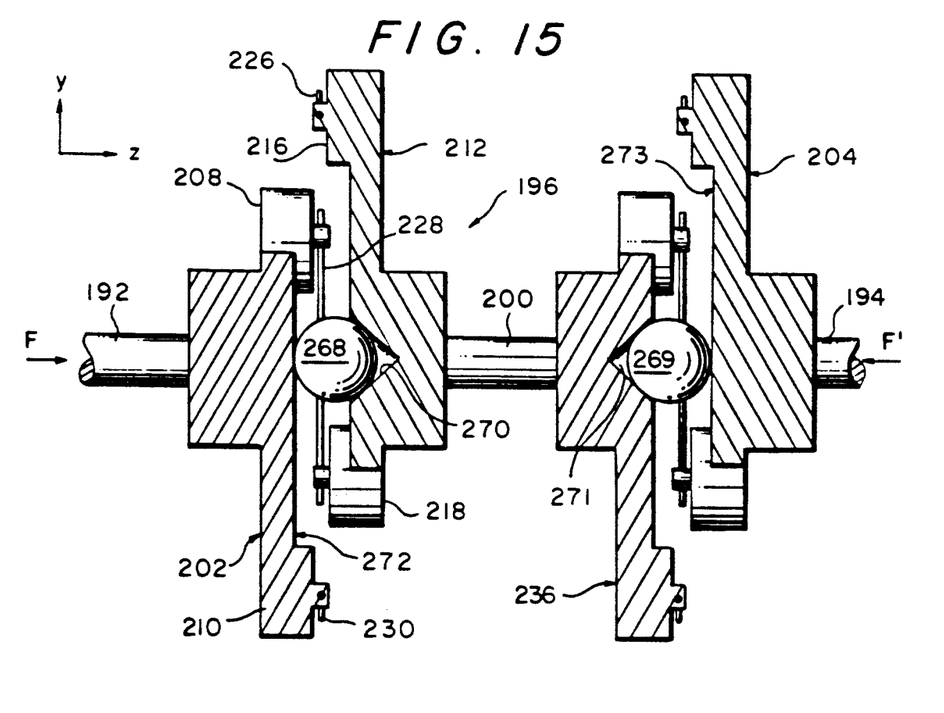
FIG. 15 is an elevational view taken along lines 6—6 14—14 of FIG. 14.

Referring now to FIGS. 13–15, there is shown a second embodiment, designated generally by the numeral 190, of the constant velocity joint 20 of FIG. 1.

The constant velocity joint 190 couples an input shaft 192, which, for example, might be a shaft such as the shaft 14 of the motor 20 of FIG. 1 to an output shaft 194, which, for example, might be a shaft such as the shaft 16 of FIG. 1 coupled to a driven device 18 such as the encoder, precision drum, or lead screw of FIG. 1.

The constant velocity joint 190 includes an input coupling element, designated generally by the numeral 196, and an output coupling element, designated generally by the numeral 198, joined by a shaft 200. The coupling elements 196 and 198 are substantially identical in configuration with the coupling element 196 having a triangular coupling hub 202 fixed to input shaft 192 and the coupling 198 having a triangular coupling hub 204 fixed to the output shaft 194.

The coupling hub 202 includes three connecting lugs 206, 208 and 210 spaced 120° apart and is aligned with a similar triangular coupling hub 212 fixed to the shaft 200 and angularly trailing the coupling hub 202 by 60°. The coupling hub 212 has lugs 216, 218 and 220, which are connected to the lugs 206, 208 and 210 of hub 202 by tangentially oriented wire flexure elements 226, 228 and 230, respectively, anchored in fixed relationship proximate first and second ends thereof to the lugs. Rigidly connected to triangular coupling hub 212, via the shaft 200, is a triangular coupling hub 236 which is angularly oriented so as to be in angular alignment with triangular coupling hub 202 on input shaft 192. Triangular coupling hub 136 has lugs 238, 240 and 242 thereon spaced 120° apart and is angularly oriented the same as triangular coupling hub 202 fixed to input shaft 192. The triangular coupling hub 236 faces the triangular coupling hub 204 fixed to the shaft 194 which is angularly oriented the same as the triangular coupling hub 112 fixed to shaft 200. The triangular coupling hub 204 has lugs 248, 250 and 252 thereon which are connected to the lugs 238, 240 and 242 of triangular coupling hub 236 by tangentially oriented wire flexure elements 258, 260 and 262 which are anchored in fixed relationship to the first and second ends of the wire flexure elements.

The wire flexure elements 226, 228, 230, 238, 240 and 242 are in the illustrated embodiment wires which flex when bent but do not elongate or shorten to any consequential degree when under tension or compression. Such bending occurs when the input and output shafts 192 and 194 are angularly misaligned.

When the input shaft 192 rotates triangular coupling hub 202 in the clockwise direction, wire elements 226, 228 and 230 are placed in tension which rotates the triangular coupling hub 216 and shaft 200 in the clockwise direction. As the shaft 200 rotates in the clockwise direction, it rotates triangular coupling hub 236 clockwise to apply tension to wire flexure elements 258, 260 and 262, thus rotating the triangular coupling hub 204 and the output shaft 194 fixed thereto in the clockwise direction.

Each of the couplings 196 and 198, when operating alone, accommodate angular misalignment. However, when one combines both the input coupling 196 and output coupling 198 to connect shafts 192 and 194, a constant velocity joint is provided which accommodates both angular and parallel misalignment of the input and output shafts.

As seen in FIG. 13, coupling 198 is identical to coupling 196 in that the triangular coupling hub 236 is oriented on shaft 200 with the same angular orientation as triangular coupling hub 202 on shaft 192. As is seen in FIG. 15, a contact element bearing 268 is disposed between the triangular coupling hub 202 fixed to shaft 192 and the triangular coupling hub 212 fixed to shaft 200 while a contact element bearing 269 is disposed between the triangular coupling hub 236 fixed to shaft 200 and triangular coupling hub 204 connects to output shaft 194. As in the first embodiment of FIGS. 10-12, the contact element bearings 268 and 269 of FIG. 15 provide constraint in the Z-direction. The contact element bearings 268 and 269 are seated in conical recesses 270 and 271 and triangular coupling hubs 212 and 236 and bear against radially extending planar surface 272 and 273 on triangular coupling hubs 202 and 204. Axial forces F-F' in the direction of shafts 192 and 194 are necessary to maintain the triangular coupling hubs 202 and 212 in engagement with the contact element bearing 268 and the triangular coupling hubs 204 and 236 in engagement with contact element bearing 269. As with the arrangement of FIG. 7, the axial forces F-F' may be supplied by a spring (not shown).

Alternatively, the contact element bearing 268 and 269 may be replaced by axial disposed wires such as the wire 106 of FIG. 8. When such wires are used there is no need for a spring to supply the axial forces F-F' of FIG. 15.

If no constraint in the Z-direction is necessary or desired, the contact element bearings 268 and 269 or wire (FIG. 8) may be deleted allowing an additional degree of freedom for the couplings 196 or 198 and an additional degree of freedom for the constant velocity joint 190 comprised of the couplings.

The constant velocity joint 190 provides a central coupling element 300 comprised of triangular coupling hubs 216 and 236 fixed to rotate with one another by shaft 200. The central coupling element 300 is connected to input shaft 192 by a joint constraining means comprised of the three, tangentially oriented, resilient wires 226, 228 and 230 and is connected to output shaft 194 by a second constraining means comprised of the three tangentially oriented wire flexure elements 258, 260 and 262.

Figure 16:
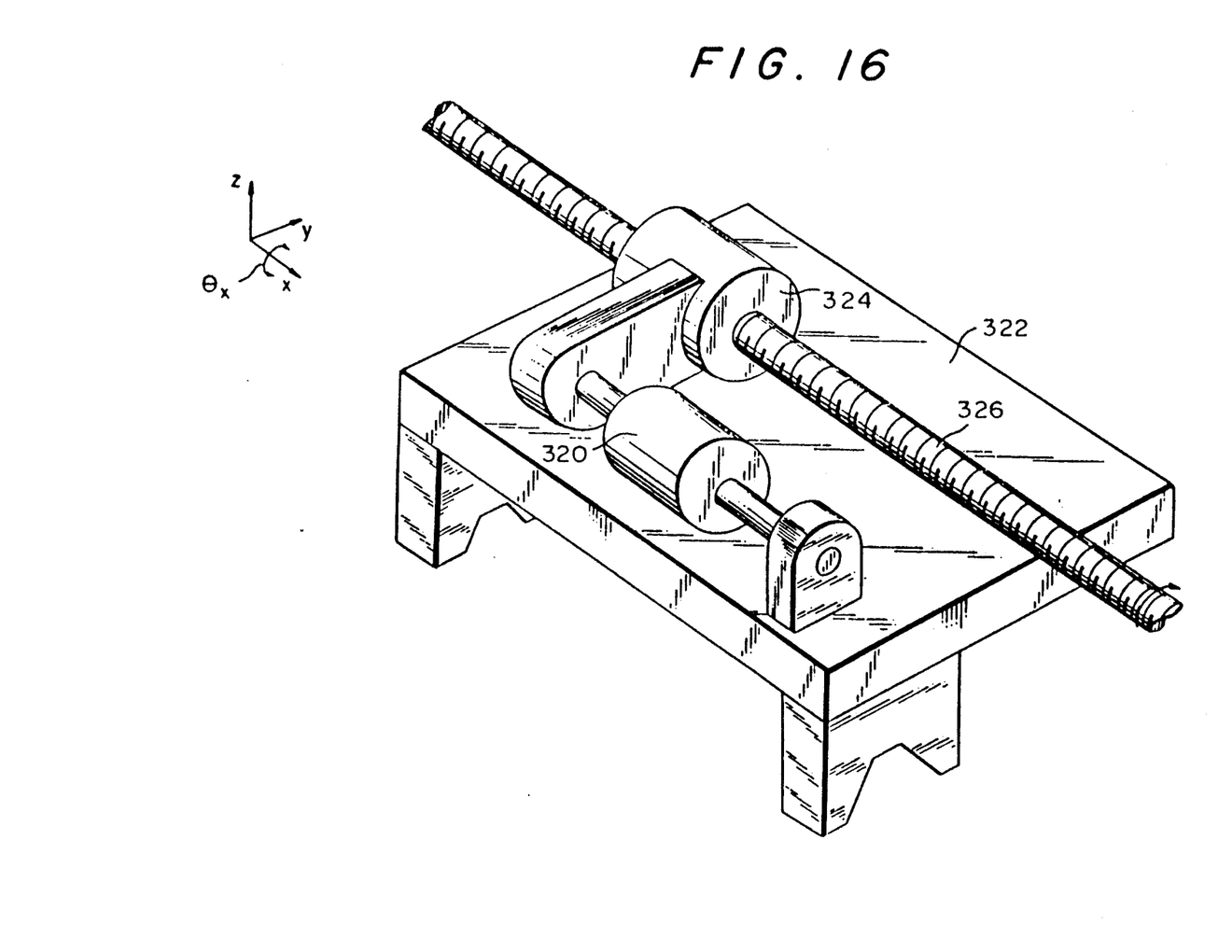
FIG. 16 is a perspective view showing a constant velocity joint configured in accordance with the principles of the instant invention used to non-rotationally couple a carriage to a nut in a lead screw driving arrangement.

Referring now to FIG. 16, while constant velocity joints are conventionally used to couple rotating shafts, it is a feature of the instant invention to use a constant velocity joint 320 to couple linearly translating, non-rotating elements to one another. In FIG. 16, a carriage 322 is coupled by the constant velocity joint 320 to a nut 324 driven by a lead screw 326. The carriage 322 does not rotate with the nut 324, but rather translates with the nut in the X direction with only X and $\Theta x$ constraint, the other degrees of freedom being free. For applications such as laser printers, it is of utmost importance the cyclic errors not be introduced as the carriage 322 is translated by rotation of the lead screw 326. In accordance with the principles of the instant invention, the constant velocity joint 320 minimizes the transmission of such errors to the carriage 322 as the lead screw 326 linearly translates the nut 324.

The entire disclosures of all applications, patents and publications, cited herein, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A constant velocity joint for connecting an input shaft to an ouput shaft, the constant velocity joint comprising: a coupling including a set of radial projections fixed to one of said shafts and a set of axial projections fixed to the other of said shafts, the radial and axial projections being arranged to be brought into positive abutment upon the application of torque to the input shaft for driving the output shaft through the coupling; point contact bearing means disposed between the input and output shafts, and resilient means comprising springs which are in tension between the radial projections on the input shaft and spring attachment means on said output shaft for urging the input and output shafts toward one another to engage the point contact bearing means between the shafts.

2. The constant velocity joint of claim 1, wherein both the radial and axial projections are spaced at 120° intervals.

3. A constant velocity joint for connecting an input shaft to an output shaft, the constant velocity joint comprising: a coupling including a set of radial projections fixed to said shafts, an intermediate coupling element disposed between said shafts and having a set of axial projections arranged to engage the radial projections on said shafts, the radial and axial projections being arranged to be brought into positive abutment upon the application of torque to the input shaft for driving the output shaft through the coupling; point contact bearing means disposed between the input and output shafts and the intermediate coupling element, and resilient means comprising springs which are in tension between the radial projections on the shafts for urging the input and output shafts toward one another to engage the point contact bearing means between the shafts.

4. The constant velocity joint of claim 3, wherein the point contact bearing means comprises a round bearing disposed between the intermediate coupling element and each of the shafts.

5. The constant velocity joint of claim 4, wherein the shafts each have flat ends in abutment with the round bearings and the intermediate coupling element has ends with indentations in which the round bearings are received.

6. The constant velocity joint of claim 5, wherein both the radial and axial projections are spaced at 120° intervals.

* * * * *